United States Patent
Nakamoto et al.

(10) Patent No.: US 11,251,484 B2
(45) Date of Patent: Feb. 15, 2022

(54) ASSEMBLY INCLUDING UNIT CELL AND SPACER

(71) Applicant: Nissan Motor Co., Ltd., Yokohama (JP)

(72) Inventors: Masahiro Nakamoto, Kanagawa (JP);
Tsutomu Iguchi, Kanagawa (JP);
Takao Iwasaki, Kanagawa (JP);
Yasuhiro Yanagihara, Kanagawa (JP)

(73) Assignee: Envision AESC Japan Ltd., Zama (JP)

( * ) Notice: Subject to any disclaimer, the term of this patent is extended or adjusted under 35 U.S.C. 154(b) by 258 days.

(21) Appl. No.: 16/336,126

(22) PCT Filed: Aug. 30, 2017

(86) PCT No.: PCT/JP2017/031238
§ 371 (c)(1),
(2) Date: Mar. 25, 2019

(87) PCT Pub. No.: WO2018/056012
PCT Pub. Date: Mar. 29, 2018

(65) Prior Publication Data
US 2020/0176727 A1 Jun. 4, 2020

(30) Foreign Application Priority Data

Sep. 26, 2016 (JP) .............................. JP2016-187428
Sep. 26, 2016 (JP) .............................. JP2016-187446

(51) Int. Cl.
*H01M 50/124* (2021.01)
*H01M 50/40* (2021.01)
(Continued)

(52) U.S. Cl.
CPC ....... *H01M 50/124* (2021.01); *H01M 50/116* (2021.01); *H01M 50/40* (2021.01); *H01M 50/531* (2021.01); *H01M 50/543* (2021.01)

(58) Field of Classification Search
CPC .. H01M 50/124; H01M 50/40; H01M 50/116; H01M 50/531; H01M 50/543;
(Continued)

(56) References Cited

U.S. PATENT DOCUMENTS

2006/0088761 A1* 4/2006 Ota .................. B60L 50/64
429/130
2009/0239142 A1 9/2009 Suto
(Continued)

FOREIGN PATENT DOCUMENTS

JP 2000-251855 A 9/2000
JP 2002-324524 A 11/2002
(Continued)

*Primary Examiner* — Christian Roldan
(74) *Attorney, Agent, or Firm* — Global IP Counselors, LLP

(57) ABSTRACT

A unit cell including a cell body, an electrode tab (an anode side electrode tab and a cathode side electrode tab) and a sealing member (laminate film). The cell body includes a power-generating element and is formed into a flat shape. The anode side electrode tab and the cathode side electrode tab extend out from the cell body. The sealing member (laminate film) includes a sheet-shaped metal layer and a sheet-shaped insulating layer that covers and insulates the metal layer from both sides to sandwich and seal the cell body. In the sealing member, an exposed end portion of a metal layer is spaced from a surface of the insulating layer, while bending at least a portion of an outer edge.

10 Claims, 7 Drawing Sheets

(51) Int. Cl.
*H01M 50/531* (2021.01)
*H01M 50/116* (2021.01)
*H01M 50/543* (2021.01)

(58) Field of Classification Search
CPC ............... H01M 50/502; H01M 50/20; H01M 2220/20; H01M 50/557; H01M 50/10; H01M 50/209; Y02E 60/10
USPC .......................................................... 429/185
See application file for complete search history.

(56) References Cited

U.S. PATENT DOCUMENTS

| | | | |
|---|---|---|---|
| 2009/0297936 A1 | 12/2009 | Nemoto et al. | |
| 2011/0014512 A1* | 1/2011 | Amagai | H01M 50/258 429/159 |
| 2011/0135997 A1 | 6/2011 | Watanabe et al. | |
| 2012/0288740 A1* | 11/2012 | Byun | H01M 50/597 429/96 |
| 2018/0309110 A1* | 10/2018 | Iwasaki | H01M 50/463 |

FOREIGN PATENT DOCUMENTS

| | | |
|---|---|---|
| JP | 2010-287568 A | 12/2010 |
| JP | 2011-171245 A | 9/2011 |
| JP | 2013-101950 A | 5/2013 |
| JP | 2014-49228 A | 3/2014 |
| JP | 5638183 B2 | 12/2014 |
| JP | 2016-139494 A | 8/2016 |
| WO | 2010/089813 A1 | 8/2010 |

* cited by examiner

ASSEMBLY INCLUDING UNIT CELL AND SPACER

CROSS-REFERENCE TO RELATED APPLICATIONS

This application is a U.S. national stage application of International Application No. PCT/JP2017/031238, filed on Aug. 30, 2017. The present application claims priority to Japanese Patent Application No. 2016-187446 and Japanese Patent Application No. 2016-187428 filed on Sep. 26, 2016, and the entire contents disclosed therein are hereby fully incorporated herein by reference.

BACKGROUND

Technical Field

The present invention relates to an assembly including a unit cell and a spacer.

Background Information

Conventionally, there is a unit cell (nonaqueous secondary battery) obtained by sandwiching a sealing a cell body (battery element) between a pair of sealing members (exterior film). The sealing member is formed by covering a sheet-shaped metal layer (moisture-proof layer) with a sheet-shaped insulating layer (synthetic resin layer). The outer edges (peripheral edge portions) of the pair of sealing members are folded and overlapped (see Japanese Laid-Open Patent Application No. 2000-251855 hereinafter referred to as Patent Document 1.).

In addition, there is a unit cell (laminate-covered battery) in which, when excess electric current flows through the electrode tab, a bridge disposed in the electrode tab is melted in order to protect the cell body (electrode body) that is housed inside the sealing member (laminate exterior body). The outer edges of both sides of the sealing member along the longitudinal direction are bent in order to save space (see Japanese Laid-Open Patent Application No. 2014-49228 hereinafter referred to as Patent Document 2.).

SUMMARY

In the unit cell disclosed in Patent Document 1, although the size thereof can be reduced because the outer edges (peripheral edge portions) of the pair of sealing members are folded and overlapped, if water droplets generated due to condensation move to the outer edges via, for example, the surfaces of the sealing members, there is the risk that the water droplets will adhere to the end portion of the exposed metal layer and cause electrical leakage.

An object of the present invention is to provide a unit cell, and an assembly of a unit cell and a spacer, which can be reduced in size while suppressing electrical leakage caused by condensation, even when a sealing member is used in which an end portion of a metal layer is exposed.

A unit cell according to the present invention which achieves the object above comprises a cell body, an electrode tab, and a sealing member. The cell body includes a power-generating element and is formed into a flat shape. The electrode tab is extends out from the cell body. The sealing member includes a sheet-shaped metal layer and a sheet-shaped insulating layer that covers and insulates the metal layer from both sides, and sandwiches and seals the cell body. In the sealing member an exposed end portion of the metal layer is spaced from the surface of the insulating layer, while at least a portion of the outer edge that extends from the cell body is bent.

An assembly of a unit cell and a spacer according to the present invention which achieves the object described above includes the above-described unit cell, and a spacer that supports the unit cell. Here, the spacer has a housing portion that houses at least an exposed portion of the end portion of the metal layer.

DETAILED DESCRIPTION OF THE EMBODIMENTS

Figure 1:
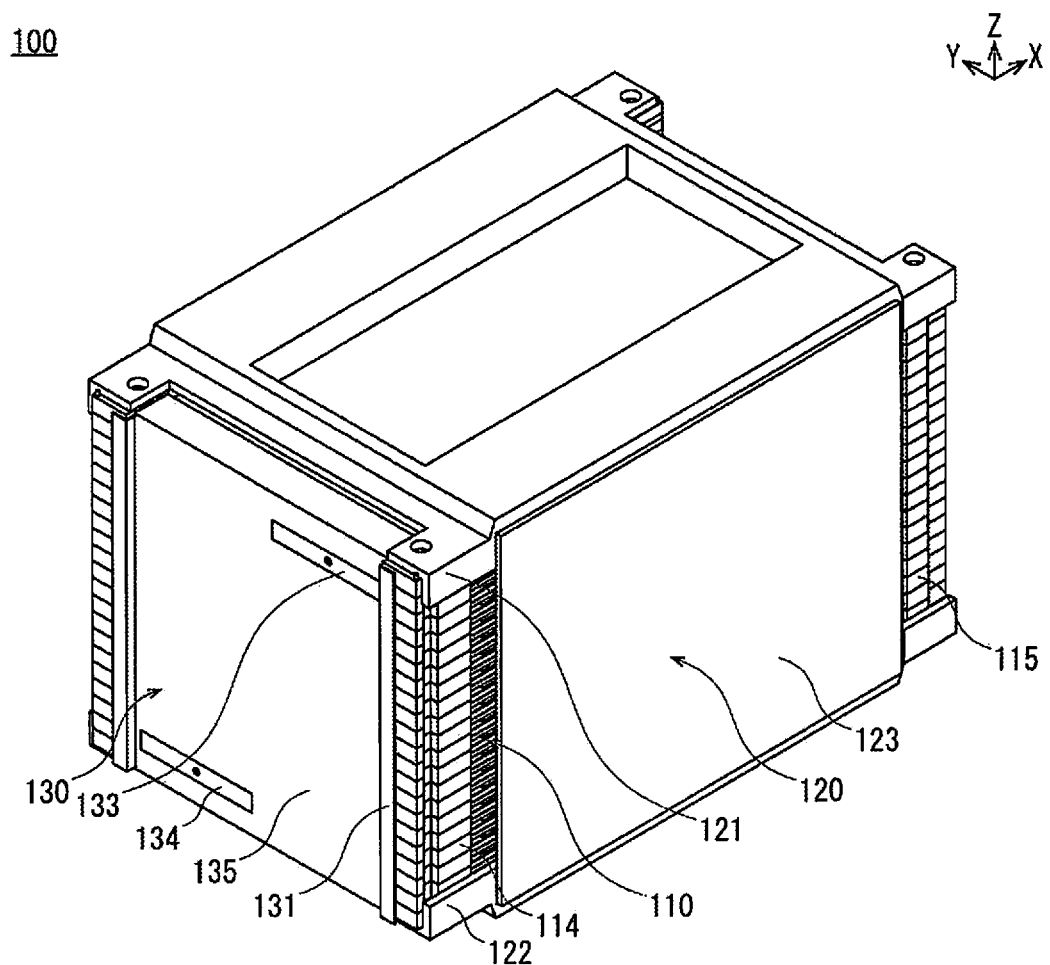
FIG. 1 is a perspective view illustrating a battery pack according to an embodiment.

An embodiment of the present invention will be explained below with reference to the appended drawings. In the drawings, the same members have been assigned the same reference symbols and redundant explanations have been omitted. In the drawings, the sizes and proportions of the members have been exaggerated for ease of understanding the embodiment, and may be different from the actual sizes and proportions.

The orientation of a battery pack 100 is shown using arrows indicated by X, Y, and Z in each of the drawings. The direction of the arrow indicated by X is the longitudinal direction of the battery pack 100. The direction of the arrow indicated by Y is the transverse direction of the battery pack 100. The direction of the arrow indicated by Z is the stacking direction of the battery pack 100.

Figure 2:
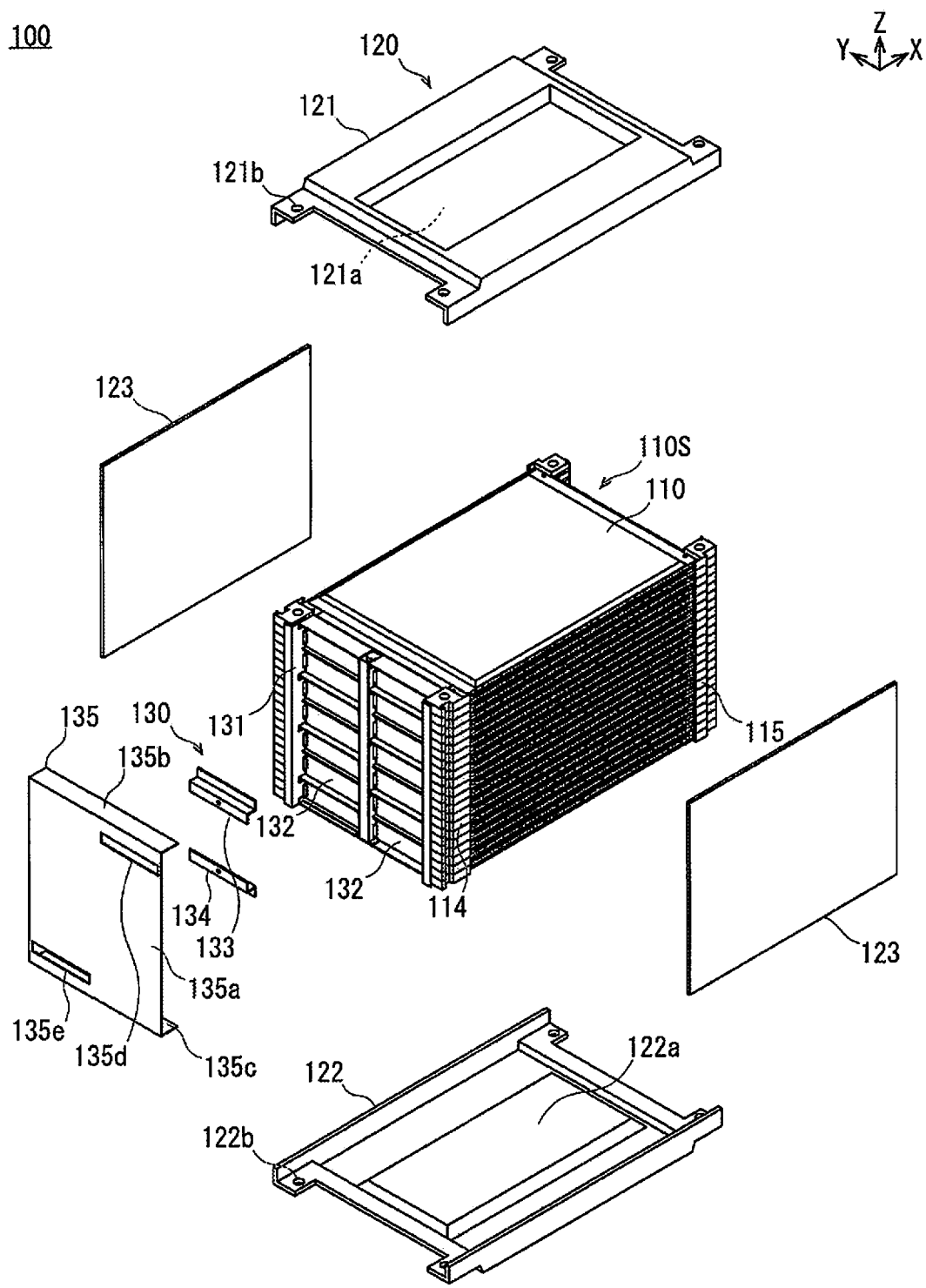
FIG. 2 is a perspective view illustrating a state in which a portion of a bus bar unit (a protective cover, an anode side terminal, and a cathode side terminal) as well as a pressurizing unit (an upper pressure plate, a lower pressure plate, and left and right side plates) are removed from the battery pack shown in FIG. 1.
Figure 3A:
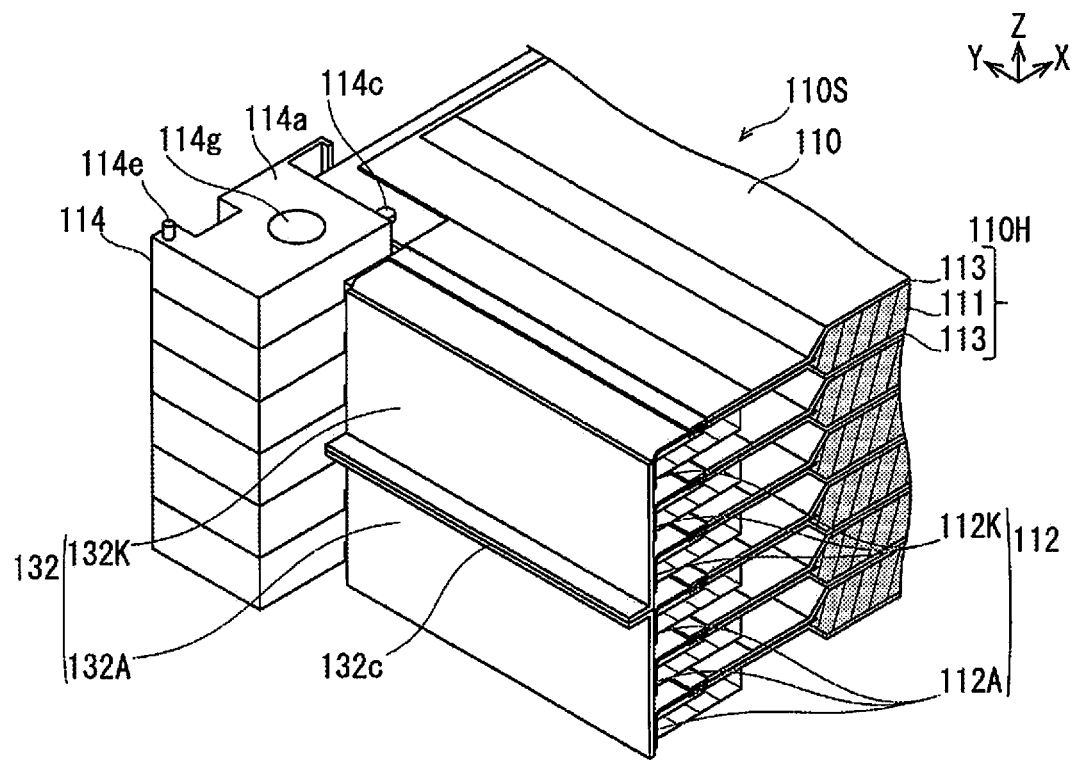
FIG. 3A is a perspective view illustrating a cross section of a main part of a state in which a bus bar is joined to electrode tabs of stacked unit cells.
Figure 3B:
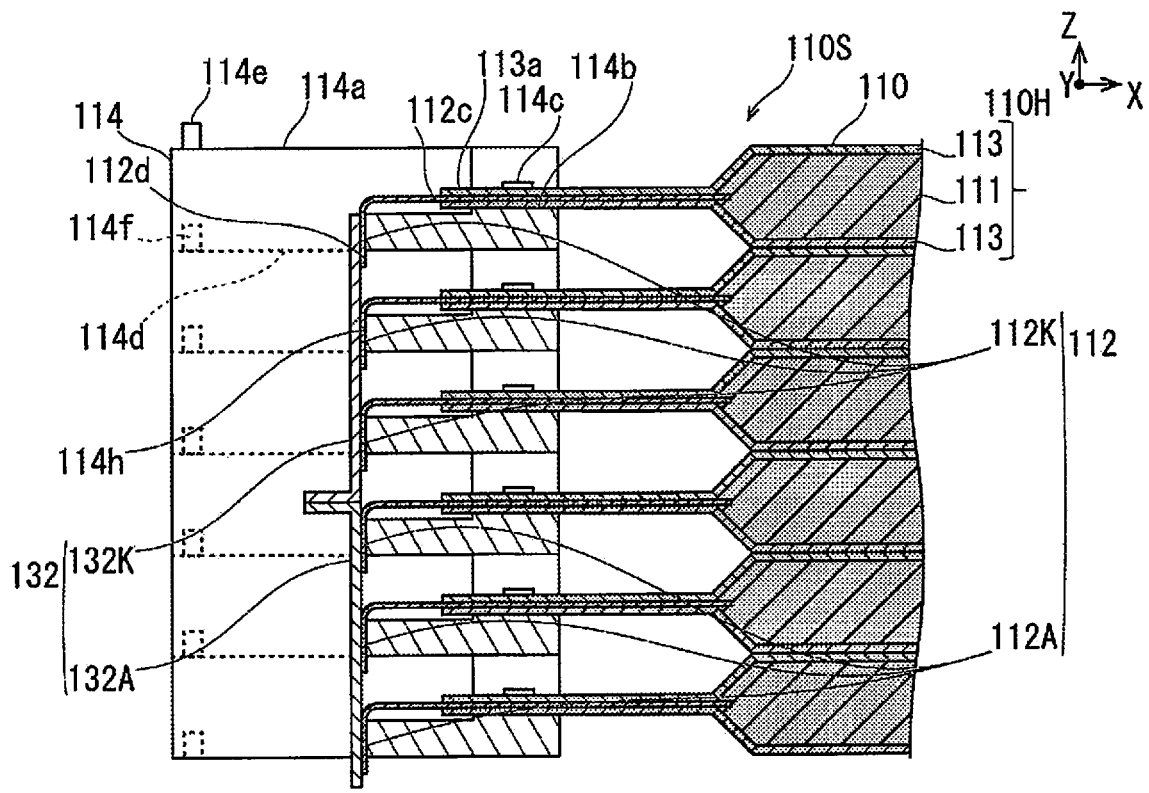
FIG. 3B is an end surface view illustrating FIG. 3A from the side.
Figure 4:
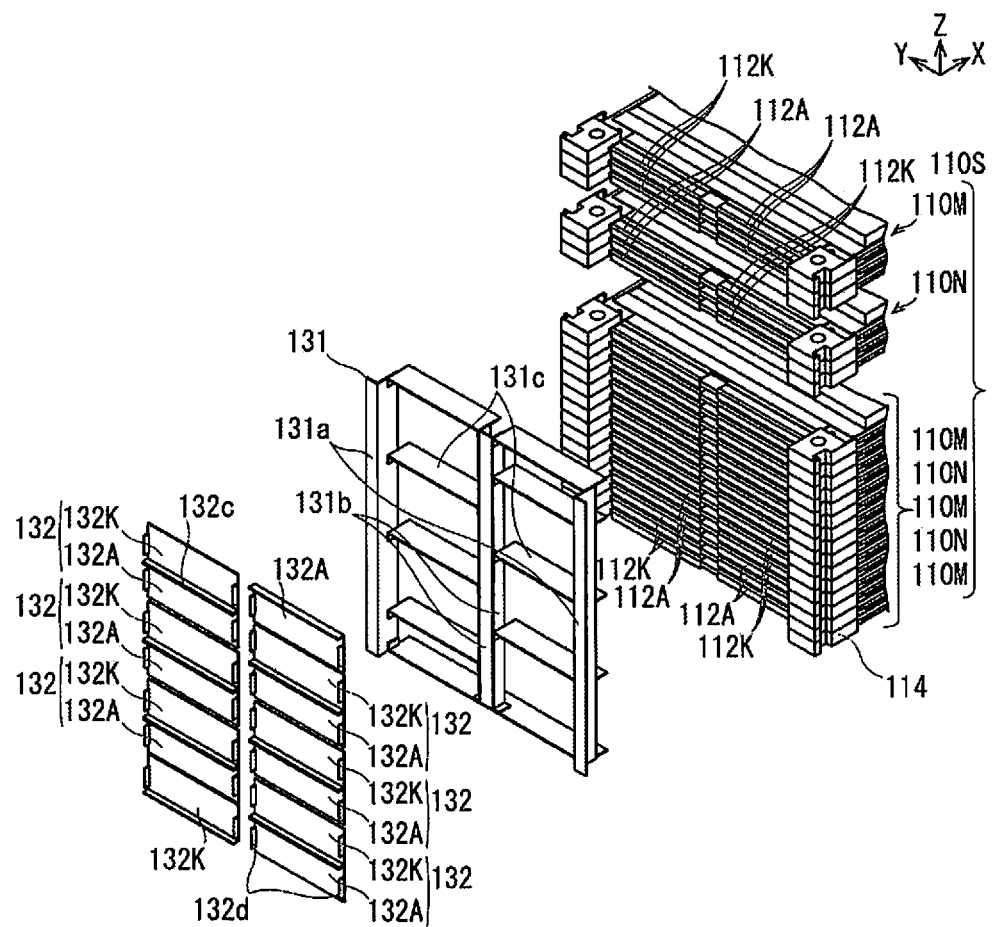
FIG. 4 is a perspective view illustrating a state in which a bus bar holder and the bus bars are removed from the stacked body illustrated in FIG. 2.
Figure 5:
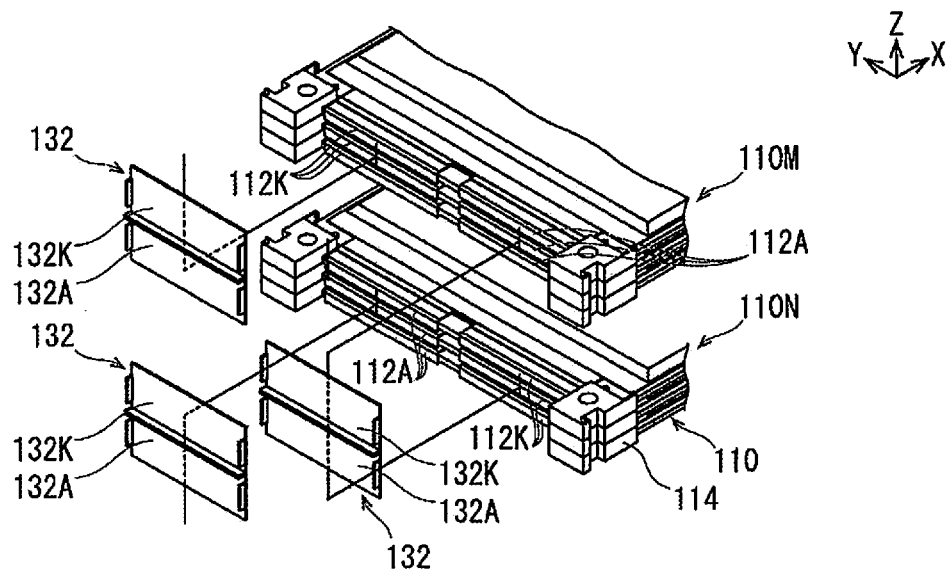
FIG. 5 is a perspective view illustrating a state in which a first cell sub-assembly and a second cell sub-assembly shown in FIG. 4 are electrically connected by means of bus bars.
Figure 6:
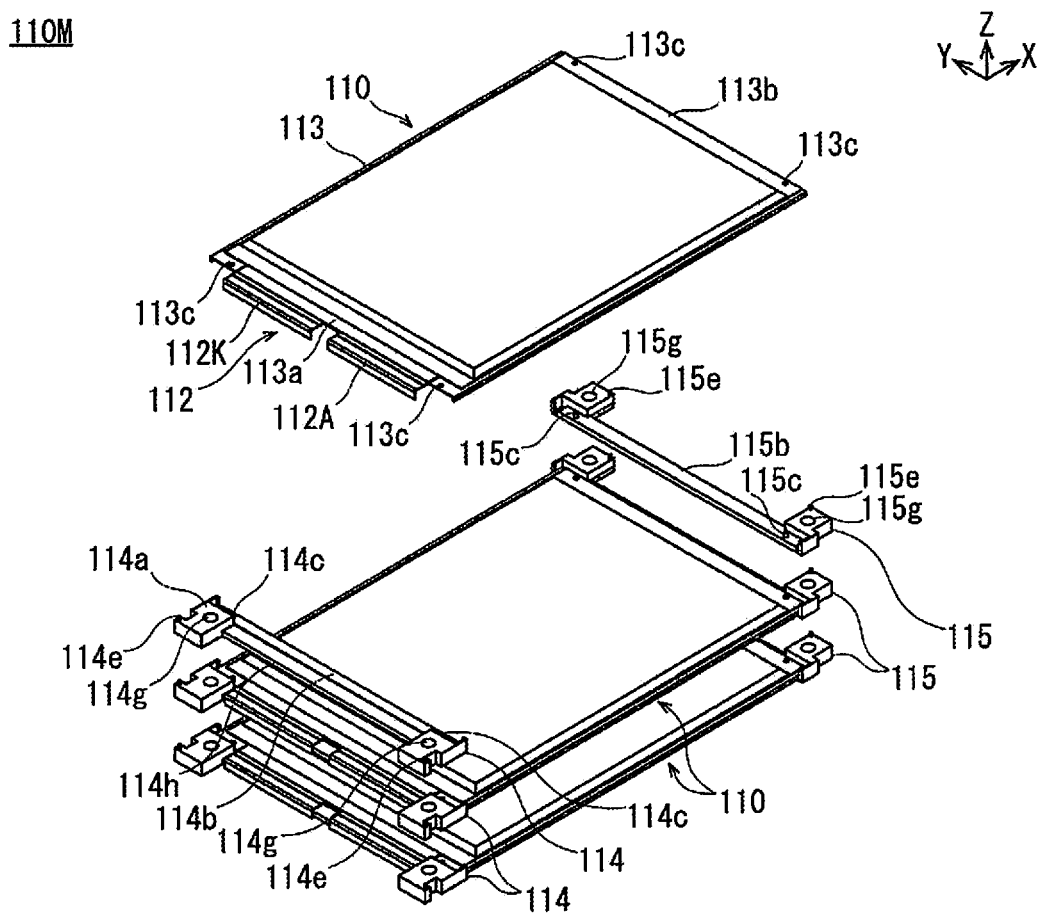
FIG. 6 is a perspective view illustrating a state in which the first cell sub-assembly (three sets of unit cells that are connected in parallel) shown in FIG. 4 is disassembled for each unit cell, and a first spacer and a second spacer are removed from one (the uppermost) unit cell thereof.
Figure 7:
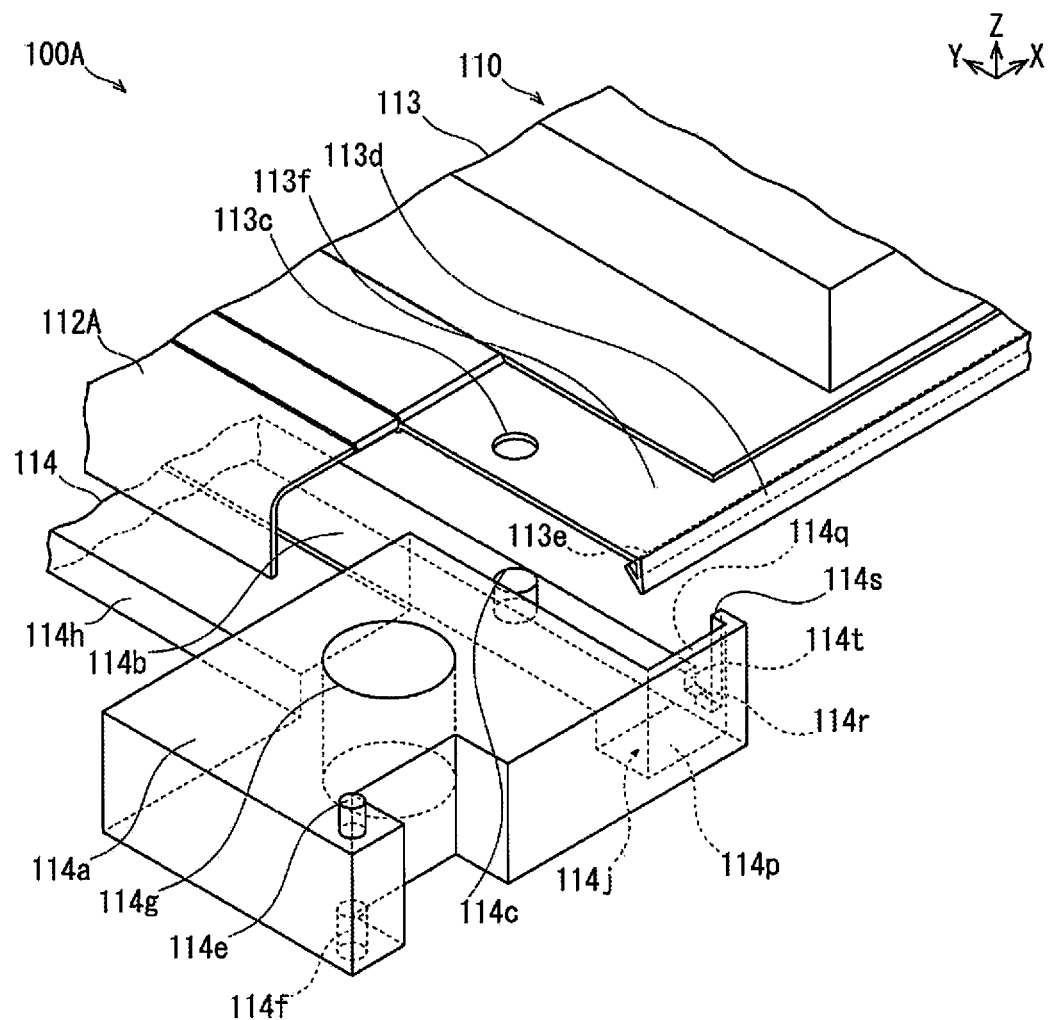
FIG. 7 is a perspective view illustrating a portion of an assembly (unit cell and first spacer).
Figure 8:
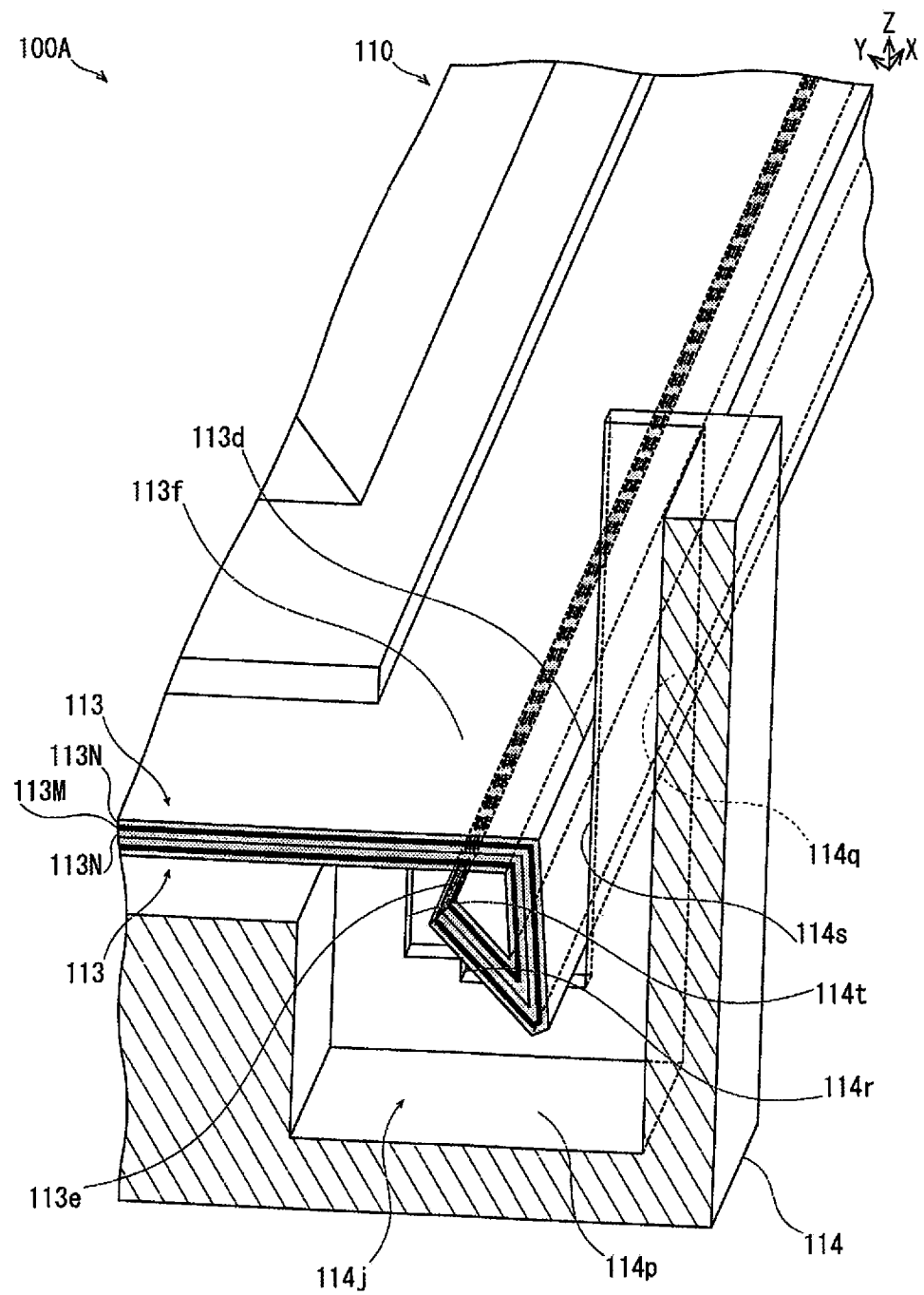
FIG. 8 is a perspective view illustrating a main part of the assembly of FIG. 7.

FIG. 1 is a perspective view illustrating the battery pack 100 according to an embodiment. FIG. 2 is a perspective view illustrating a state in which a portion of a bus bar unit 130 (a protective cover 135, an anode side terminal 133, and a cathode side terminal 134) as well as a pressurizing unit 120 (an upper pressure plate 121, a lower pressure plate 122, and left and right side plates 123) are removed from the battery pack 100 shown in FIG. 1. FIG. 3A is a perspective view illustrating a cross section of a main part of a state in which a bus bar 132 is joined to electrode tabs 112 of stacked unit cells 110. FIG. 3B is an end surface view illustrating FIG. 3A from the side. FIG. 4 is a perspective view illustrating a state in which a bus bar holder 131 and the bus bars 132 are removed from a stacked body 110S illustrated in FIG. 2. FIG. 5 is a perspective view illustrating a state in which a first cell sub-assembly 110M and a second cell sub-assembly 110N shown in FIG. 4 are electrically connected by means of the bus bars 132. FIG. 6 is a perspective view illustrating a state in which the first cell sub-assembly 110M (three sets of unit cells 110 that are connected in parallel) shown in FIG. 4 is disassembled for each unit cell 110, and a first spacer 114 and a second spacer 115 are removed from one (the uppermost) unit cell 110 thereof. FIG. 7 is a perspective view illustrating a portion of an assembly 100A (unit cell 110 and first spacer 114). FIG. 8 is a perspective view illustrating a main part of the assembly 100A of FIG. 7.

With reference to FIGS. 3A and 8, the unit cell 110 according to the embodiment generally comprises a cell body 110H, an electrode tab 112 (corresponding to an anode side electrode tab 112A and a cathode side electrode tab 112K), and a sealing member (corresponding to a laminate film 113). The cell body 110H includes a power-generating element 111 and is formed into a flat shape. The anode side electrode tab 112A and the cathode side electrode tab 112K extend out from the cell body 110H. A pair of the laminate films 113 includes a sheet-shaped metal layer 113M, and a sheet-shaped insulating layer 113N that covers and insulates the metal layer 113M from both sides, and sandwiches and seals the cell body 110H. Here, the pair of laminate films 113 has at least a portion of the outer edge 113d that extends from the cell body 110H being bent, and an exposed end portion 113e of the metal layer 113M is spaced from the surface 113f of the insulating layer 113N.

With reference to FIGS. 3A and 8, the battery pack 100 according to the embodiment generally comprises the above-described unit cell 110, and spacers (corresponding to a first spacer 114 and a second spacer 115) that support the unit cell 110. Here, the first spacer 114 and the second spacer 115 have, for example, a housing portion 114j that has an insulating property, which houses at least a portion of the exposed end portion 113e of the metal layer 113M.

A plurality of the battery packs 100, which include the assembly 100A of the unit cell 110 and the spacers (first spacer 114 and second spacer 115), are mounted in a vehicle such as an electric vehicle and are used as a power source for driving a vehicle motor. The battery pack 100 is configured by electrically connecting a stacked body 110S, obtained by stacking a plurality of the unit cells 110 by means of a bus bar unit 130, in a state of pressurization by a pressurizing unit 120. Each configuration of the battery pack 100, including the assembly 100A of the unit cell 110 and the spacers (first spacer 114 and second spacer 115), will be described below.

The configuration of the stacked body 110S will be described in detail.

As shown in FIG. 4, the stacked body 110S is configured by alternately connecting in series the first cell sub-assembly 110M, which includes three of the unit cells 110 that are electrically connected in parallel, and the second cell sub-assembly 110N, which includes three of the unit cells 110 that are electrically connected in parallel.

As shown in FIG. 4, the first cell sub-assembly 110M corresponds to the three unit cells 110 that are positioned in the first row (lowermost row), the third row, the fifth row, and the seventh row (uppermost row) of the battery pack 100. As shown in FIG. 4, the second cell sub-assembly 110N corresponds to the three unit cells 110 that are positioned in the second row, the fourth row, and the sixth row of the battery pack 100.

The first cell sub-assembly 110M and the second cell sub-assembly 110N are similarly configured. However, the first cell sub-assembly 110M and the second cell sub-assembly 110N are arranged such that three anode side electrode tabs 112A and three cathode side electrode tabs 112K are alternately positioned along the Z direction, by interchanging the tops and bottoms of the three unit cells 110, as illustrated in FIGS. 4 and 5.

In the first cell sub-assembly 110M, all of the anode side electrode tabs 112A are positioned on the right side in the drawing, and all of the cathode side electrode tabs 112K are positioned on the left side in the drawing, as illustrated in FIGS. 4 and 5.

In the second cell sub-assembly 110N, all of the anode side electrode tabs 112A are positioned on the left side in the drawing, and all of the cathode side electrode tabs 112K are positioned on the right side in the drawing, as illustrated in FIGS. 4 and 5. If the tops and bottoms are simply interchanged every three of the unit cells 110, the orientations of the distal end portions 112d of the electrode tabs 112 will vary vertically in the Z direction. Therefore, each of the distal end portions 112d is bent downward so that the orientations of all of the distal end portions 112d of the electrode tabs 112 of the unit cells 110 are aligned.

The unit cell 110 corresponds to a lithium-ion secondary battery, for example. A plurality of the unit cells 110 are connected in series in order to satisfy the drive voltage specification of the vehicle motor. A plurality of the unit cells 110 are connected in parallel in order to ensure the battery capacity and to extend the travel distance of the vehicle.

The unit cell 110 includes a cell body 110H, which includes a power-generating element 111 and is formed into a flat shape, an electrode tab 112 for exposing the power-generating element 111 to the outside, and a laminate film 113 for sealing the power-generating element 111, as illustrated in FIGS. 3A and 3B.

The power-generating element 111 is charged with electric power from an outdoor charging station, or the like, and supplies driving power to the vehicle motor, or the like, by discharging the electric power. The power-generating element 111 is formed by stacking a plurality of sets of anodes and cathodes that are separated by separators.

The electrode tab 112 is for exposing the power-generating element 111 to the outside, as illustrated in FIGS. 3A, 3B, and 4. The electrode tab 112 includes the anode side electrode tab 112A and the cathode side electrode tab 112K. The proximal end side of the anode side electrode tab 112A is joined to all of the anodes included in one of the power-generating element 111. The anode side electrode tab 112A has the form of a thin plate and is made of aluminum in accordance with the characteristics of the anode. The proximal end side of the cathode side electrode tab 112K is joined to all of the cathodes included in one of the power-generating element 111. The cathode side electrode tab 112K has the form of a thin plate and is made of copper in accordance with the characteristics of the cathode.

The electrode tab 112 is L-shaped from a proximal end portion 112c adjacent to the power-generating element 111 to the distal end portion 112d, as illustrated in FIG. 3B. The distal end portion 112d of the electrode tab 112 is bent downward in the Z direction. The shape of the distal end portion 112d of the electrode tab 112 is not limited to the form of an L. For example, the electrode tab 112 may be U-shaped by further extending the distal end portion 112d and by folding back the extended portion toward the power-generating element 111. In addition, the proximal end portion 112c of the electrode tab 112 may have an undulating or curved form. The distal end portion 112d of the electrode tab 112 makes surface contact with the bus bar 132.

The laminate film 113 is configured in pairs and is for sealing the cell body 11014 from above and below along the Z direction, as illustrated in FIGS. 3A and 3B. In the pair of laminate films 113, the anode side electrode tab 112A and the cathode side electrode tab 112K extend out to the outside from gaps between one end portions 113a thereof along the Y direction.

The laminate film 113 includes a sheet-shaped metal layer 113M and a sheet-shaped insulating layer 113N that covers and insulates the metal layer 113M from both sides, as illustrated in FIG. 8. The outer edges 113d of the pair of laminate films 113 that extend from the cell body 110H on both sides of the unit cell 110 along the X direction have two bends, as illustrated in FIGS. 7 and 8. The outer edges 113d have a total of two bends: one bend downward in the Z direction, which is the stacking direction of the unit cells 110; and another bend protruding upwards. The bent portion of the outer edge 113d is inclined with respect to the Z direction, such that the exposed end portion 113e of the metal layer 113M faces the cell body 110H. In the pair of laminate films 113 the exposed end portion 113e of the metal layer 113M is spaced from the surface 113f of the insulating layer 113N, as illustrated in FIG. 8.

The unit cells 110 are stacked, as illustrated in FIGS. 3 and 4, in a state of support by means of a pair of spacers (first spacer 114 and second spacer 115), as illustrated in FIG. 6.

The pair of spacers (first spacer 114 and second spacer 115) are used to arrange the unit cells 110 at constant intervals along the Z direction, as illustrated in FIGS. 2, 3A, and 3B. The first spacer 114 supports the unit cell 110 on the side provided with the electrode tab 112. The second spacer 115 supports the unit cell 110 on the side not provided with the electrode tab 112, so as to oppose the first spacer 114 in the X direction of the unit cell 110.

The first spacer 114 has the form of an elongated plate having recesses and protrusions, as illustrated in FIG. 6, and is made from reinforced plastic having an insulating property. The first spacer 114 is provided so as to oppose the one end portions 113a of the pair of laminate films 113. The first spacer 114 supports the one end portion 113a of the laminate film 113 by means of a flat supporting surface 114b, as illustrated in FIGS. 3 and 6. The first spacer 114 has an abutting surface 114h on a wall surface along the Z direction adjacent to the supporting surface 114b. The abutting surface 114h positions the distal end portion 112d of the electrode tab 112 along the X direction, as illustrated in FIG. 3B. The first spacer 114 has a pair of connecting pins 114c that respectively protrude upward at both ends of the supporting surface 114b along the Y direction, as illustrated in FIG. 6. The pair of connecting pins 114c are cylindrical in form and are inserted into connecting holes 113c that are formed at both ends of the end portion 113a of the laminate film 113 along the Y direction, thereby positioning the unit cell 110.

In a plurality of the first spacers 114, an upper surface 114a of one first spacer 114 and a lower surface 114d of another first spacer 114 are in contact, as illustrated in FIG. 3B. The plurality of first spacers 114 are positioned relative to each other by fitting a cylindrical positioning pin 114e that protrudes from the upper surface 114a of one first spacer 114 being fitted into a positioning hole 114f that opens onto the lower surface 114d of another first spacer 114, as illustrated in FIG. 3B. The first spacer 114 is provided with locating holes 114g at both ends along the Y direction, as illustrated in FIG. 6. Bolts for connecting and positioning a plurality of the battery packs 100 relative to each other along the Z direction are inserted in the locating holes 114g.

Moreover, the first spacer 114 and the second spacer 115 have, for example, a housing portion 114j with an insulating property, which houses a portion of the exposed end portion 113e of the metal layer 113M, as illustrated in FIGS. 7 and 8. The housing portion 114j has the form of a recessed hole that is formed by cutting off a portion of an upper surface 114a of the first spacer 114 and a portion of the supporting surface 114b adjacent to said upper surface 114a, from the upper side to the lower side, and that has a rectangular bottom surface 114p.

The housing portion 114j has a first protrusion 114r that protrudes in a protruding shape from the bottom surface 114p upward in a stepped manner, as illustrated in FIGS. 7 and 8. The first protrusion 114r constitutes a portion of a stepped side wall in the concave housing portion 114j along the Y direction of the unit cell 110. The first protrusion 114r comes into contact with the bent outer edge 113d of the laminate film 113 from below to restrict the position of the outer edge 113d. That is, the first protrusion 114r functions as a restricting portion that forcibly separates the exposed end portion 113e of the metal layer 113M so as to float from the bottom surface 114p of the housing portion 114j. In addition, the first protrusion 114r restricts the angle of the outer edge 113d such that the exposed end portion 113e of the metal layer 113M does not come into contact with the side wall 114t of the unit cell 110 that is adjacent along the Y direction. That is, the first protrusion 114r functions as a restricting portion that separates the exposed end portion 113e of the metal layer 113M from the side wall 114t of the housing portion 114j.

The housing portion 114j has a second protrusion 114s that protrudes in a protruding shape from an inner-side surface 114q thereof inward, as illustrated in FIGS. 7 and 8. The second protrusion 114s constitutes a portion of a side wall in the concave housing portion 114j along the Y direction of the unit cell 110. The second protrusion 114s comes into contact with the bent outer edge 113d of the laminate film 113 from the side to restrict the position of the outer edge 113d. That is, second protrusion 114s functions as a restricting portion that forcibly separates the exposed end portion 113e of the metal layer 113M from the inner-side surface 114q of the housing portion 114j.

Since it is not necessary for the second spacer to support the electrode tab 112, the second spacer 115 is configured by simplifying the first spacer 114. Similar to the first spacer 114, as shown in FIG. 6, the second spacer 115 includes a supporting surface 115b for supporting the other end portion 113b of the laminate film 113, positioning pins 115e for positioning the second spacers with respect to each other, connecting pins 115c for positioning the unit cell 110, and locating holes 115g into which are inserted bolts for connecting and positioning a plurality of the battery packs 100 with respect to each other.

Moreover, in the same manner as the first spacer 114, the second spacer 115 has, for example, a housing portion with an insulating property, which houses the exposed end portion 113e of the metal layer 113M, a protruding first protrusion that protrudes from the bottom surface of the housing portion, a protruding second protrusion that protrudes from the inner-side surface of the housing portion, etc.

The configuration of the pressurizing unit 120 will be described in detail.

The pressurizing unit 120 includes the upper pressure plate 121 and the lower pressure plate 122, which pressurize the power-generating element 111 of each of the unit cells 110 of the stacked body 110S from above and below, and a pair of side plates 123 that fix the upper pressure plate 121 and the lower pressure plate 122 in a state of pressurization of the stacked body 110S.

The upper pressure plate 121, together with the lower pressure plate 122, hold and sandwich the plurality of the unit cells 110 that constitute the stacked body 110S from above and below and pressurize the power-generating element 111 of each of the unit cells 110, as illustrated in FIGS. 1 and 2. The upper pressure plate 121 has the form of a plate with recesses and protrusions and is made from a metal possessing sufficient rigidity. The upper pressure plate 121 is provided on a horizontal plane. The upper pressure plate 121 has a pressurizing surface 121a that pressurizes the power-generating element 111 downwards, as illustrated in FIG. 2. The pressurizing surface 121a is formed flat, protruding downward from a central portion of the upper pressure plate 121. The upper pressure plate 121 has locating holes 121b, into which bolts for interconnecting the battery packs 100 are inserted. The locating holes 121b are through-holes formed at the four corners of the upper pressure plate 121.

The lower pressure plate 122 has the same shape as the upper pressure plate 121, and is provided so that the top and bottom of the upper pressure plate 121 can be inverted, as illustrated in FIG. 2. Like the upper pressure plate 121, the lower pressure plate 122 includes a pressurizing surface 122a that pressurizes the power-generating element 111 upwards, and locating holes 122b, into which for connecting and positioning the battery packs 100 relative to each other along the Z direction are inserted bolts.

The pair of side plates 123 are for fixing the upper pressure plate 121 and the lower pressure plate 122 in a state of pressurization of the stacked body 110S, as illustrated in FIGS. 1 and 2. That is, the pair of side plates 123 hold the interval between the upper pressure plate 121 and the lower pressure plate 122 constant. In addition, the pair of side plates 123 cover and protect the side surfaces of the stacked unit cells 110 along the X direction. The side plate 123 has the form of a flat plate and is made of metal. The pair of side plates 123 stand upright so as to face both side surfaces of the stacked unit cells 110 along the X direction. The pair of side plates 123 are welded to the upper pressure plate 121 and the lower pressure plate 122.

The configuration of the bus bar unit 130 will be described in detail.

The bus bar unit 130 includes a bus bar holder 131 that integrally holds a plurality of the bus bars 132, the bus bars 132 that electrically interconnect the vertically adjacent electrode tabs 112 of the unit cells 110, an anode side terminal 133 that causes the anode side terminal ends of the plurality of the electrically connected unit cells 110 to oppose an external input/output terminal, a cathode side terminal 134 that causes the cathode side terminal ends of the plurality of the electrically connected unit cells 110 to oppose an external input/output terminal, and a protective cover 135 for protecting the bus bars 132, and the like.

The bus bar holder 131 is for integrally holding a plurality of the bus bars 132, as illustrated in FIGS. 2 and 4. The bus bar holder 131 integrally holds the plurality of the bus bars 132 in a matrix so as to oppose the electrode tab 112 of each of the unit cells 110 of the stacked body 110S. The bus bar holder 131 is made of resin having insulating properties, and has the form of a frame.

The bus bar holder 131 is respectively provided with a pair of columnar support portions 131a that stand upright along the Z direction, so as to be positioned on both sides of the longitudinal direction of the first spacers 114 that support the electrode tabs 112 of the unit cells 110, as illustrated in FIG. 4. The pair of columnar support portions 131a are fitted to the side surfaces of the first spacers 114. The pair of columnar support portions 131a have the form of an L when viewed along the Z direction and have the form of a plate that extends in the Z direction. The bus bar holder 131 is provided with a pair of auxiliary columnar support portions 131b at an interval to stand upright along the Z direction so as to be positioned in the vicinity of the center of the first spacer 114 in the longitudinal direction. The pair of auxiliary columnar support portions 131b have the form of a plate shape that extends in the Z direction.

The bus bar holder 131 includes insulating portions 131c that respectively protrude between adjacent bus bars 132 along the Z direction, as illustrated in FIG. 4. The insulating portions 131c have the form of a plate that extends in the Y direction. Each of the insulating portions 131c is provided horizontally between the columnar support portion 131a and the auxiliary columnar support portion 131b. The insulating portion 131c prevents discharge by insulating the space between bus bars 132 that are adjacent to each other along the Z direction.

The bus bar holder 131 may be configured by joining together the columnar support portions 131a, the auxiliary columnar support portions 131b, and the insulating portions 131c, which are independently formed, or may be configured by integrally molding the columnar support portions 131a, the auxiliary columnar support portions 131b, and the insulating portions 131c.

As shown in FIGS. 3A, 3B, 4, and 5, the bus bars 132 are for electrically interconnecting the vertically adjacent electrode tabs 112 of the unit cells 110. The bus bars 132 electrically connect the anode side electrode tab 112A of one unit cell 110 and the cathode side electrode tab 112K of another unit cell 110. For example, the bus bars 132 connect three vertically arranged anode side electrode tabs 112A of the first cell sub-assembly 110M and three vertically arranged cathode side electrode tabs 112K of the second cell sub-assembly 110N, as illustrated in FIG. 5.

That is, for example, the bus bars 132 connect the three anode side electrode tabs 112A of the first cell sub-assembly 110M in parallel and connect the three cathode side electrode tabs 112K of the second cell sub-assembly 110N in parallel, as illustrated in FIG. 5. Moreover, the bus bars 132 connect the three anode side electrode tabs 112A of the first cell sub-assembly 110M and the three cathode side electrode tabs 112K of the second cell sub-assembly 110N in series. The bus bars 132 are laser-welded to the anode side electrode tab 112A of one unit cell 110 and the cathode side electrode tab 112K of another unit cell 110.

As shown in FIGS. 3A and 4, the bus bar 132 is formed by joining the anode side bus bar 132A and the cathode side bus bar 132K. The anode side bus bar 132A and the cathode side bus bar 132K have the same shape, each having the form of an L. The bus bar 132 is integrally formed by a joint portion 132c, which is formed by joining one bent end of the anode side bus bar 132A to one bent end of the cathode side bus bar 132K, as illustrated in FIGS. 3A and 4. The anode side bus bar 132A and the cathode side bus bar 132K, which constitute the bus bar 132, are provided with side portions 132*d* that are joined to the bus bar holder 131 at both ends in the Y direction, as illustrated in FIG. 4.

The anode side bus bar 132A is made of aluminum in the same manner as the anode side electrode tab 112A of the unit cell 110. The cathode side bus bar 132K is made of copper, in the same manner as the cathode side electrode tab 112K of the unit cell 110. The anode side bus bar 132A and the cathode side bus bar 132K, which are made of different metals, are joined to each other by means of ultrasonic bonding, to form the joint portion 132*c*.

Of the bus bars 132 arranged in the form of a matrix, the bus bar 132 positioned on the upper right in the drawing in FIG. 4 corresponds to the anode side terminal ends of 21 unit cells 110 (3 parallel 7 series) and includes only the anode side bus bar 132A. This anode side bus bar 132A is laser-welded to the anode side electrode tabs 112A of the three uppermost unit cells 110 of the stacked unit cells 110.

Of the bus bars 132 arranged in the form of a matrix, the bus bar 132 positioned on the lower left in the drawing in FIG. 4 corresponds to the cathode side terminal ends of 21 unit cells 110 (3 parallel 7 series) and includes only the cathode side bus bar 132K. This cathode side bus bar 132K is laser-welded to the cathode side electrode tabs 112K of the three lowermost unit cells 110 of the stacked unit cells 110.

As shown in FIGS. 1 and 2, the anode side terminal 133 causes the anode side terminal ends of the plurality of the electrically connected unit cells 110 to oppose an external input/output terminal. The anode side terminal 133 is joined to the anode side bus bar 132A positioned on the upper right in the drawing, from among the bus bars 132 arranged in a matrix, as illustrated in FIG. 2. The anode side terminal 133 has the form of a plate, both ends of which are bent and is made from a conductive metal.

The cathode side terminal 134 causes the cathode side terminal ends of the plurality of the electrically connected unit cells 110 oppose an external input/output terminal, as illustrated in FIGS. 1 and 2. The cathode side terminal 134 is joined to the cathode side bus bar 132K positioned on the lower left in the drawing, from among the bus bars 132 arranged in a matrix, as illustrated in FIG. 2. The cathode side terminal 134 has the shape of the anode side terminal 133, with the top and bottom inverted.

As shown in FIGS. 1 and 2, the protective cover 135 is for protecting the bus bars 132, and the like. That is, the protective cover 135 integrally covers the plurality of the bus bars 132 to thereby prevent each of the bus bars 132 from coming into contact with other members, etc., to cause an electrical short-circuit. The protective cover 135 is made from a plastic having an insulating property, where one end 135*b* and the other end 135*c* of a side surface 135*a* standing upright along the Z direction are bent claw-like in the X direction, as illustrated in FIG. 2.

The protective cover 135 covers each of the bus bars 132 with the side surface 135*a*, while sandwiching and fixing the bus bar holder 131 from above and below with the one end 135*b* and the other end 135*c*. The protective cover 135 has a first opening 135*d*, which is a rectangular hole and is for exposing the anode side terminal 133 to the outside, and a second opening 135*e*, which is a rectangular hole and is for exposing the cathode side terminal 134 to the outside, on the side surface 135*a*.

The action and effects of the above-described embodiment will be described below.

The unit cell 110 comprises the cell body 110H, the anode side electrode tab 112A, the cathode side electrode tab 112K, and the pair of laminate films 113. The cell body 110H includes a power-generating element 111 and has a flat shape. The anode side electrode tab 112A and the cathode side electrode tab 112K extend out from the cell body 110H. The pair of the laminate films 113 includes the sheet-shaped metal layer 113M and the sheet-shaped insulating layer 113N that covers and insulates the metal layer 113M from both sides, and sandwiches and seals the cell body 110H. In the pair of laminate films 113, the exposed end portion 113*e* of the metal layer 113M is spaced from the surface 113*f* of the insulating layer 113N, while at least a portion of the outer edge 113*d* that extends from the cell body 110H is bent.

The assembly 100A comprises the above-described unit cell 110 and the spacers (first spacer 114 and second spacer 115) that support the unit cell 110. Here, the first spacer 114 has, for example, the housing portion 114*j* that houses at least an exposed portion of the end portion 113*e* of the metal layer 113M.

By means of the unit cell 110 and the assembly 100A configured in this manner, in a state in which the outer edge 113*d* of the laminate film 113 is bent, the exposed end portion 113*e* of the metal layer 113M of the outer edge 113*d* is spaced from the surface 113*f* of the laminate film 113. That is, even if water droplets, water film, or a water column that are generated due to condensation move along the surface 113*f* of the laminate film 113, it is possible to prevent contact thereof with the end portion 113*e* of the metal layer 113M. Moreover, by means of the unit cell 110 and the assembly 100A configured in this manner, since the outer edge 113*d* of the laminate film 113 is bent, it is possible to improve the volumetric efficiency and to reduce the size. Therefore, by means of the unit cell 110 and the assembly 100A of the unit cell 110 and the spacers (first spacer 114 and second spacer 115), it is possible to reduce the size while preventing electrical leakage caused by condensation, even when the laminate film 113 in which the end portion 113*e* of the metal layer 113M is exposed is used. When a configuration is employed in which the end portion 113*e* of the metal layer 113M is insulated with a member having an insulating property, the manufacturing cost would increase.

In the unit cell 110, the outer edge 113*d* is preferably bent toward the side of the cell body 110H.

By means of the unit cell 110 configured in this manner, even if the water droplets that are generated due to condensation in the members surrounding the unit cell 110 move to the laminate film 113 side of the unit cell 110, it is possible to make it difficult for the water droplets to come into contact with the end portion 113*e* of the metal layer 113M. Accordingly, the unit cell 110 can prevent electrical leakage caused by condensation.

In the unit cell 110, the outer edge 113*d* is preferably bent a plurality of times.

According to the unit cell 110 configured in this manner, even if the water droplets that are generated due to condensation move along the surface 113*f* of the laminate film 113, it is possible to make it difficult for the water droplets to reach the end portion 113*e* of the metal layer 113M. Accordingly, the unit cell 110 can prevent electrical leakage caused by condensation.

In the unit cell 110, the cell body 110H is preferably disposed horizontally, and the outer edge 113*d* is preferably bent downward and then bent so as to project upwards.

By means of the unit cell 110 configured in this manner, it is possible to make it difficult for the water droplets, which are generated due to condensation and naturally fall, to come into contact with the end portion 113*e* of the metal layer 113M. In addition, even if the water droplets that are generated due to condensation and fall naturally come into contact with the end portion 113*e* of the metal layer 113M, it is possible to separate the water droplets from the end portion 113e of the metal layer 113M. Accordingly, the unit cell 110 can prevent electrical leakage caused by condensation. Additionally, since the exposed end portion 113e of the metal layer 113M faces upwards, it is not necessary to cut out a large portion of an underlying component member (such as the first spacer 114), and thus it is possible to maintain the rigidity of said component member (such as the first spacer 114).

In the assembly 100A, the housing portion 114j preferably has a restricting portion (for example, the first protrusion 114r or the second protrusion 114s) that comes into contact with the outer edge 113d so as to separate the exposed end portion 113e of the metal layer 113M from an inner surface (for example, the bottom surface 114.p or the inner-side surface 114q) of the housing portion 114j, to thereby restrict the position of the outer edge 113d.

By means of the assembly 100A configured in this manner, it is possible to make it difficult for the water droplets, which are generated due to condensation and reaches the housing portion 114j, to come into contact with the end portion 113e of the metal layer 113M, which is spaced from the inner surface of the housing portion 114j by the restricting portion. Accordingly, the assembly 100A can prevent electrical leakage caused by condensation.

In the assembly 100A, the cell body 110H is preferably disposed horizontally, the outer edge 113d is preferably bent downwards, the housing portion 114j is preferably a recessed hole that extends downward, and the restricting portion preferably includes the protruding first protrusion 114r that partially protrudes from the bottom surface 114p of the housing portion 114j.

By means of the assembly 100A configured in this manner, it is possible to make it difficult for the water droplets or water film, which are generated due to condensation and accumulate on the bottom surface 114p of the housing portion 114j, to come into contact with the end portion 113e of the metal layer 113M, which is spaced from the bottom surface 114p by the first protrusion 114r. Accordingly, the assembly 100A can prevent electrical leakage caused by condensation.

In the assembly 100A, the cell body 110H is preferably disposed horizontally, the outer edge 113d is preferably bent downwards, the housing portion 114j is preferably a recessed hole that extends downward, and the restricting portion preferably includes the protruding second protrusion 114s that partially protrudes from the inner-side surface 114q of the housing portion 114j.

By means of the assembly 100A configured in this manner, it is possible to make it difficult for the water droplets or water column, which are generated due to condensation and move along the inner-side surface 114q of the housing portion 114j, to come into contact with the end portion 113e of the metal layer 113M, which is spaced from the inner-side surface 114q by the second protrusion 114s. Accordingly, the assembly 100A can prevent electrical leakage caused by condensation.

The assembly 100A comprises the unit cell 110 and the spacers (first spacer 114 and second spacer 115). The unit cell 110 comprises the cell body 110H, the anode side electrode tab 112A, the cathode side electrode tab 112K, and the pair of laminate films 113. The cell body 110H includes the power-generating element 111 and is formed into a flat shape. The anode side electrode tab 112A and the cathode side electrode tab 112K extend out from the cell body 110H. The pair of the laminate films 113 includes the sheet-shaped metal layer 113M and the sheet-shaped insulating layer 113N that covers and insulates the metal layer 113M from both sides, and sandwiches and seals the cell body 110H, while at least a portion of the outer edge 113d that extends from the cell body 110H is bent. The spacers (first spacer 114 and second spacer 115) include the housing portion 114j that has an insulating property and that houses at least a portion of the exposed end portion 113e of the metal layer 113M, and support the unit cell 110.

By means of the assembly 100A configured in this manner, in a state in which the outer edge 113d of the laminate film 113 is bent, the exposed end portion 113e of the metal layer 113M of the outer edge 113d is housed in the housing portion 114j. That is, the assembly 100A can prevent the end portion 113e of the metal layer 113M from coming into contact with the surrounding members. Moreover, by means of the assembly 100A, since the outer edge 113d of the laminate film 113 is bent, it is possible to improve the volumetric efficiency and to reduce the size. Therefore, by means of the assembly 100A, it is possible to reduce the size while preventing conduction (short-circuiting and electrical leakage) with the surrounding members, even when using the laminate film 113 in which the end portion 113e of the metal layer 113M is exposed. When a configuration is employed in which the end portion 113e of the metal layer 113M is insulated with a member having an insulating property, the manufacturing cost would increase.

In addition, by means of the assembly 100A configured in this manner, in a state in which the outer edge 113d of the laminate film 113 is bent, the exposed end portion 113e of the outer edge 113d of the metal layer 113M is housed in the housing portion 114j; it is thereby possible to avoid the generation of the water film when condensation occurs. Accordingly, the assembly 100A can sufficiently prevent conduction (short-circuiting or electrical leakage) with the surrounding members caused by condensation.

In addition, the assembly 100A configured in this manner can be sufficiently applied, for example, to the battery pack 100 in which a plurality of the spacers are tightly stacked such that the upper surface 114a of one of the first spacer 114 abuts the lower surface 114d of another of the first spacer 114, as illustrated in FIG. 3B. Accordingly, the assembly 100A is able to secure a spatial distance, particularly from metal members that are highly conductive, by separating the exposed end portion 113e the metal layer 113M of the laminate film 113 by means of the housing portion 114j of the spacer (first spacer 114 and second spacer 115).

Other than the foregoing, various modifications to the present invention based on the configurations described in the Claims are possible, which also belong in the scope of the present invention.

For example, the outer edges 113d of the pair of laminate films 113 may be bent upwards in the stacking direction of the unit cells 110, and the housing portion 114j of the spacer (first spacer 114 and second spacer 115) can be configured as a hole that opens upwards from below.

In addition, a configuration was explained in which the cell body 110H is sandwiched and sealed by means of the pair of laminate films 113, but the cell body 110H may be sandwiched and sealed by folding one sheet of laminate film 113. Even with such a configuration, a metal layer is exposed at the side surface portion where the end portions are overlapped with each other; thus, the action and effect of the present invention can be achieved.

Additionally, the pair of laminate films 113 may be folded back and overlapped such that the exposed end portion 113e of the metal layer 113M comes into contact with the surface 113f of the insulating layer 113N. That is, it is not necessary to separate the exposed end portion 113e of the metal layer 113M from the surface 113f of the insulating layer 113N in the pair of laminate films 113.

The invention claimed is:

1. An assembly comprising:
a unit cell including a cell body having a power-generating element and being formed in a flat shape, an electrode tab extending out from the cell body, and a sealing member enclosing and sealing the cell body, the sealing member including a metal layer that is sheet-shaped and an insulating layer that is sheet-shaped, the insulating layer covering and insulating the metal layer from both sides; and
a spacer that supports the unit cell, the spacer having the form of an elongated plate with an upper surface and a lower surface spaced apart from each other in a thickness direction of the spacer, the spacer including a housing portion having the form of a recessed hole that is recessed from the upper surface toward the lower surface,
the sealing member having an outer edge extending from the cell body, at least a portion of the outer edge being bent towards the spacer such that an exposed end portion of the metal layer is spaced from portions of the insulating layer other than an end edge of the insulating layer,
the outer edge being bent into the housing portion such that at least a portion of the exposed end portion of the metal layer is housed in the housing portion, and
the housing portion including a restricting portion that contacts the outer edge of the sealing member to restrict a position of the outer edge, the restricting portion comprising a first protrusion that partially projects from a bottom surface of the housing portion and a second protrusion that partially projects from an inner-side surface of the housing portion.

2. The assembly according to claim 1, wherein the restricting portion separates the exposed end portion of the metal layer from an inner surface of the housing portion.

3. The assembly according to claim 1, wherein the housing portion has an insulating property.

4. An assembly comprising:
a unit cell including a cell body having a power-generating element and being formed in a flat shape, an electrode tab extending out from the cell body, and a sealing member enclosing and sealing the cell body, the sealing member including a metal layer that is sheet-shaped and an insulating layer that is sheet-shaped, the insulating layer covering and insulating the metal layer from both sides; and
a spacer that supports the unit cell, the spacer having the form of an elongated plate with an upper surface and a lower surface spaced apart from each other in a thickness direction of the spacer, the spacer including a housing portion having the form of a recessed hole that is recessed from the upper surface toward the lower surface,
the sealing member having an outer edge extending from the cell body, at least a portion of the outer edge being bent towards the lower surface such that an exposed end portion of the metal layer is spaced from portions of the insulating layer other than an end edge of the insulating layer and such that at least a portion of the exposed end portion of the metal layer is housed in the housing portion, and
the housing portion including a restricting portion that contacts the outer edge of the sealing member to restrict a position of the outer edge.

5. The assembly according to claim 4, wherein the restricting portion separates the exposed end portion of the metal layer from an inner surface of the housing portion.

6. The assembly according to claim 4, wherein
the restricting portion comprises a protrusion that partially projects from a bottom surface of the housing portion.

7. The assembly according to claim 4, wherein
the restricting portion comprises a protrusion that partially projects from an inner-side surface of the housing portion.

8. The assembly according to claim 4, wherein
the housing portion has an insulating property.

9. The assembly according to claim 4, wherein the portion of the outer edge is bent in two locations so as to have two bends.

10. The assembly according to claim 9, wherein the two bends include a first bend where the portion is bent toward the lower surface and a second bend closer to an outermost edge where the portion is bent away from the lower surface.

* * * * *